US009066122B1

(12) United States Patent
Rattazzi et al.

(10) Patent No.: US 9,066,122 B1
(45) Date of Patent: *Jun. 23, 2015

(54) SERVING VIDEO CONTENT SEGMENTS

(71) Applicant: Google Inc., Mountain View, CA (US)

(72) Inventors: Nicholas Urbano Rattazzi, Los Gatos, CA (US); Nareshkumar Rajkumar, San Jose, CA (US); Vinod Kumar Ramachandran, Sunnyvale, CA (US); Wook Jin Chung, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,951

(22) Filed: Mar. 8, 2013

(51) Int. Cl.
*H04N 7/025* (2006.01)
*H04N 21/2668* (2011.01)

(52) U.S. Cl.
CPC .................................. *H04N 21/2668* (2013.01)

(58) Field of Classification Search
CPC ............ H04N 21/2547; H04N 21/812; H04N 7/17318; H04N 5/44543
See application file for complete search history.

(56) References Cited

U.S. PATENT DOCUMENTS

| 7,778,872 | B2 * | 8/2010 | Kamangar et al. ......... 705/14.52 |
| 7,805,052 | B2 * | 9/2010 | Nakamura et al. ............ 386/326 |
| 8,160,923 | B2 | 4/2012 | Taylor et al. |
| 2007/0157228 | A1 * | 7/2007 | Bayer et al. ...................... 725/34 |
| 2008/0066107 | A1 | 3/2008 | Moonka et al. |
| 2009/0006375 | A1 | 1/2009 | Lax et al. |
| 2010/0070510 | A1 * | 3/2010 | Agarwal et al. ............... 707/748 |

* cited by examiner

*Primary Examiner* — Jefferey Harold
*Assistant Examiner* — Samira Monshi
(74) *Attorney, Agent, or Firm* — John D. Lanza; Foley & Lardner LLP

(57) ABSTRACT

A method, executed on a processor, for serving a video content segment at an online resource includes receiving a request for a video content segment having one or more playback features; identifying, by the processor, one or more candidate video content segments responsive to the request; accessing, by the processor, for each of the candidate video content segments, a score based on (i) one or more metrics related to a measure of the probability of the video content segment being played and (ii) a bid; identifying, by the processor, one or more candidate sets of candidate video segments, where, for each set, the candidate video content segments in the set collectively satisfy the one or more playback features; and selecting, by the processor, in response to the request, one of the candidate sets whose cumulative scores are higher than at least one other candidate set.

18 Claims, 10 Drawing Sheets

SERVING VIDEO CONTENT SEGMENTS

BACKGROUND

Online resources such as Internet Web pages provide opportunities for companies to market their products and services and to build brand awareness. These opportunities may be met when a company succeeds in getting information about its products and services posted on the Web pages. An example of such a Web page is one that displays search results returned as a result of a query submitted by a Web site visitor. Along with the displayed search results, the search results Web page also may display content segments that the company has produced to publicize its products and services. One typical mechanism for selecting which content segments should be served with the search results Web page involves an auction in which companies submit bids for the placement of their content segments.

SUMMARY

A method, executed on a processor, for serving a video content segment at an online resource includes receiving a request for a video content segment having one or more playback features; identifying, by the processor, one or more candidate video content segments responsive to the request; accessing, by the processor, for each of the candidate video content segments, a score based on (i) one or more metrics related to a measure of the probability of the video content segment being played and (ii) a bid; identifying, by the processor, one or more candidate sets of candidate video segments, where, for each set, the candidate video content segments in the set collectively satisfy the one or more playback features; and selecting, by the processor, in response to the request, one of the candidate sets whose cumulative scores are higher than at least one other candidate set

DESCRIPTION OF THE DRAWINGS

The detailed description refers to the following figures in which like numerals refer to like items, and in which.

DETAILED DESCRIPTION

Figure 1A:
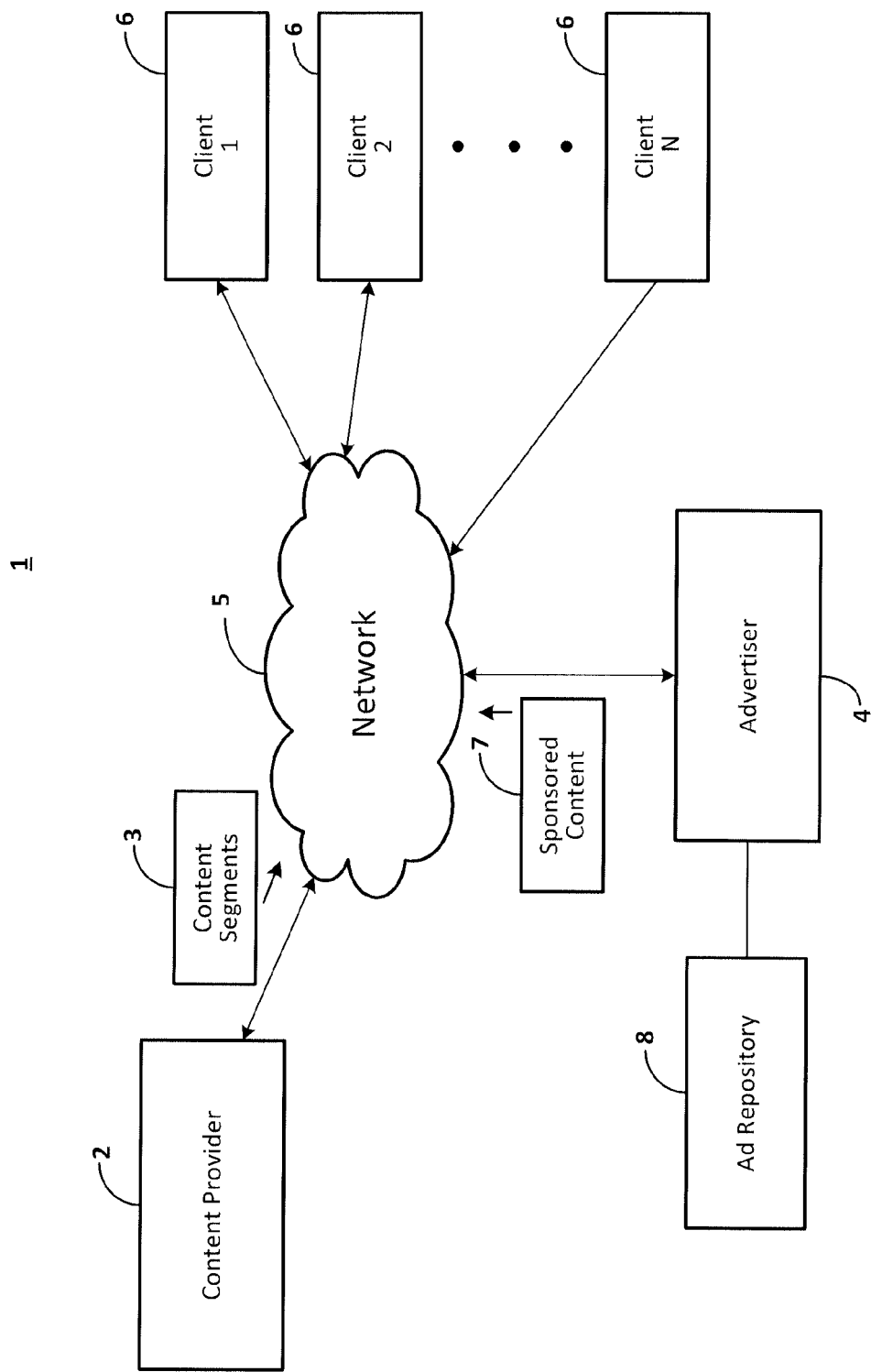
FIGS. 1A and 1B illustrate example environments in which video content segments may be served at online resources in a manner to increase revenue.

Online resources such as Internet Web pages provide opportunities for companies to market their products and services and to build brand awareness. These opportunities may be met when a company succeeds in getting information about its products and services posted on the Web pages. An example of such a Web page is one that displays search results returned as a result of a query submitted by a Web site visitor. Along with the displayed search results, the search results Web page also may display content segments that the company has produced to publicize its products and services. In this case, content segments may be advertisements. A typical mechanism for selecting which content segments should be served with the search results Web page involves an auction system in which companies submit bids for the placement of their content segments. A higher bid ordinarily enhances the chances of a content segment being selected.

A company may enter bids using a cost-per-click (CPC) basis or cost-per-thousand impression (CPM) basis. In an example, a CPM bid may be converted to an estimated CPC bid by multiplying the CPM bid with a click-through rate for the content segment. Content segments in the auction then may be ordered based on the actual or estimate CPC bids, and the content segments highest in the order may be selected. However, this auction system does not guarantee a maximum revenue generation.

To improve the content selection process, and in particular to improve the revenue generated from the display of the content segments, additional mechanisms, disclosed herein, may be used. For example, static content segments displayed on a Web page may be priced using the cost per click (CPC) system. That is, a content segment supplier pays a Web publisher when a Web site visitor clicks on a displayed content segment. The Web site publisher then may want to consider the probability that the Web site visitor actually will click on a content segment. Thus, the probability of a click, or p(Click), may be used in conjunction with a bid amount in the content selection process. One implementation would be: $SELECT_{cs} = p(Click) \times max.bid$. In this $SELECT_{cs}$ algorithm, p(Click) is the probability that a Web site visitor will click on a content segment given that the content segment is displayed on the Web page. max.bid is the maximum amount the company will pay to display the content segment on the Web page. Use of this $SELECT_{cs}$ algorithm means that not only must the company bid well for its content segments to be selected, the content segment also must have a sufficiently high p(Click).

While the $SELECT_{cs}$ algorithm may be implemented for static content segments, its implementation for non-static (e.g., video) content segments may not be possible, or at least may result in inaccurate data. One reason for this disparity of application is that non-static (e.g., video) content segments typically are sold as part of a CPM-based deal. This process for selling video content segments does not take into account a probability that a Web site visitor will click on and actually view a video content segment. In other words, in a CPM-based deal, there may be no p(Click) of a video content segment to insert in the $SELECT_{cs}$ algorithm. This and other factors unique to video content segments may limit mechanisms for accurately capturing revenue based on the display of a video content segment.

Beyond the fact that the $SELECT_{cs}$ algorithm may not apply well in the context of a video content segment, other aspects and features of video content segments may be considered when defining a pricing regime for the display of video content segments on Web pages. For example, unlike static content segments, video content segments have the characteristic, feature, or dimension of length of time. That is, video content segments consume time, and to be most effective in conveying their intended message, generally have to be watched in their entirety, or at least in a significant part of their entirety. A Web site visitor may have only five (5) minutes to devote to viewing the contents of a Web page. A video content segment that is five (5) minutes in length therefore, if watched in its entirety, will consume the visitor's allotted watching time. As a result, the Web site visitor is not able to view other content segments, whether video or static. And as a result of this situation, the Web site publisher may lose revenue because the cumulative revenue from five one-minute video content segments may exceed the revenue from a single five (5) minute content segment.

To overcome the above described limitations with static content segment pricing mechanisms, also disclosed herein are systems and methods that price video content segments for display at an online resource by considering an "interestingness factor" and features, such as length, that differentiate video content segments from static content segments. While the discussion that follows refers to video content segments, the systems and methods apply equally to animated content segments, or content segments having a mixture of animation, video, and static display. In an embodiment, the systems and methods include a revenue optimizing video content segment ranking algorithm that takes into account unique video features and dimensions such as length of a video, noisiness of a video, optical characteristics of a video such as contrast, and other features and dimensions.

FIG. 1A is a simplified example of an environment that may improve revenue generation when serving video content segments. In FIG. 1A, environment 1 includes content provider 2, advertiser 4, and clients 6, all of which communicate over network 5. Also included in environment 1 is advertising repository 8. The content provider 2 primarily provides content segments 3, the advertiser 4 primarily provides sponsored content 7, and the clients 6 primarily receive the content segments 3 and the sponsored content 7. In an embodiment, the advertiser 4 provides the sponsored content 7 to the content provider 2. The content provider 2 then includes the sponsored content 7 with the content segments 3. In another embodiment, the content provider provides the content segments 3, which include a link to the sponsored content 7, and the clients 6 then retrieve the sponsored content 7 from the advertiser 4 using the link.

The discussion that follows may refer to the sponsored content 7 as advertisements or ads; or, in the singular, as an advertisement or an ad. In an embodiment, the advertisements include video advertisements and static advertisements. However, the sponsored content 7 may include other advertisement forms. As noted, the advertiser 4 may provide the advertisements for presentation with the content segments 3, such as videos, and embedded executables or software, provided by the content provider 2. For example, the content provider 2 may provide a content segment 3 through the network 5 to one or more clients 6. The advertisements may be distributed through network 5 to one or more clients 6 before, during, or after presentation of the content segment 3. The advertiser 4 may be coupled to the advertising repository 8, and may retrieve advertisements to serve with the content segments 3. The clients 6 may be any media devices capable of displaying the content segments 3 and the sponsored content 7.

In order to present the content segments 3 to a client 6 through the network 5, the content provider 2 may incorporate a Web server, and the content segments 3 then may be presented on Web pages written in the Hypertext Markup Language (HTML), or any language suitable for authoring Web pages. The content provider 2 may be an individual user, a Web publisher, or another entity capable of distributing content over the network 5. The content provider 2 may make the content segments 3 available using a specific address, or URL. The content provider 2 may receive requests from the clients 6 for content segments 3. The content provider 2 may retrieve and then provide the requested content segments 3 in response to the request.

The content segments 3 may include various forms of electronic media. For example, a content segment 3 may include text, audio, video, advertisements, configuration parameters, documents, video files published on the Internet, television programs, audio podcasts, video podcasts, live or recorded talk shows, video voicemail, segments of a video conversation, and other distributable content. The content segments 3 may include sports, news, weather, entertainment, games, applications, or other content items. The content segments 3 may include content such as documents (e.g., Web pages, plain text documents, dynamic network applications provided to the user on-the-fly, Portable Document Format (PDF) documents, images), and video or audio clips. The content segments 3 may be graphic-intensive, media-rich data, such as, for example, FLASH-based content that presents video and audio or Asynchronous JavaScript and XML (AJAX) based Web applications or Web pages. The content segments 3 may include, for example, a live or recorded television program, a live or recorded theatrical or dramatic work, a music video, a televised event (e.g., a sports event, a political event, and a news event), and an animated feature.

In an embodiment, the advertiser 4, or another entity, may identify which sponsored content 7 (e.g., advertisements) should be served with the content segments 3 based on the subject matter of the content segments 3, metadata related to the content segments 3, and information related to the clients 6. For example, the advertiser 4 may acquire information about the subject matter of a content segment 3, such as by reading content segment metadata that includes keywords describing the subject matter of the content segment 3, analyzing audio (e.g., speech) in the content segment 3, analyzing the visual content of the content segment 3, for example. The advertiser 4 or content provider 2 may obtain information about a client 6 such as, for example, that the client 6 is a smartphone. The information may be used to identify relevant advertisements, from which one or more advertisements are selected for presentation with the content segment 3.

A video content segment, referred to hereafter as a video program, includes content that can be perceived visually when played, rendered, or decoded. A video program includes video data, and optionally audio data, executable code, hyperlinks, and metadata. Video data includes content that can be perceived visually when the video program is played, rendered, or decoded. Audio data includes content in the video program that can be perceived aurally when the video program is played, decoded, or rendered. Executable code includes, for example, interactive ADOBE FLASH, JavaScript, or other forms of interactive content. Hyperlinks include, for example, links embedded in or associated with the video program or executable code that provide an address link, such as a Uniform Resource Locator (URL), to other content or executable code.

A video program also may include many types of associated data, referred to hereafter as metadata. Metadata may include, for example, tags, labels, keywords, time stamps, XML-enclosed data, or other non-displayed information about the content. Metadata may include video data, audio data, closed-caption or subtitle data, a transcript, content descriptions (e.g., title, actor list, genre information, first performance or release date, etc.), related still images, user-supplied or provider-provided tags and ratings. Some metadata, such as a description, may refer to the entire video program, while other metadata (e.g., closed-caption data) may be temporally-based or time coded. Temporally-based data may be used to detect scene or content changes to determine relevant portions of that data for selecting advertisements.

The video programs may include one or more advertisement slots. The slots may occur before, during, or after a video program plays. One or more video or static advertisements may be presented in between portions of a video program separated by an advertisement slot. The positions of the advertisement slots may be specified in metadata for the video program, and such metadata may be stored at content provider 2.

In addition to advertisement slots, the video program may be accompanied by overlay advertisement slots. The overlay advertisements slots may cover a small portion of the normal viewing area of a video program when displayed at a client 6.

The content provider 2 may provide video programs for presentation at a client 6. The video programs may be presented as a stream or as a downloadable file to a client 6. The content provider 2 also may provide a video player module with the video program. In an embodiment, the content provider 2 provides a video program and a video player is embedded in a Web page. The Web page may include the video player and a reference to the video program. The Web page may be sent to the client 6. At the client 6, the embedded video player may retrieve the referenced video program for playback.

In an embodiment, a resource such as a Web page and a video program embedded in the resource are provided by different content providers. For example, a first content provider may embed (or provide) in a second Web page provided by a second content provider a link to a video at a first Web page. The link is a location (e.g., a URL) of the first Web page. When the second Web page is rendered at the client 6, the video may be obtained from the second content provider by activating the link.

Video programs may be described by several physical characteristics. A video program has a defined length in units of time. A video program will have a specific contrast that is measurable by electronic devices. A video program may incorporate audio data. The audio data may vary in terms of loudness when the video program is played at a client 6.

A video advertisement, as a form of sponsored content 7, may have many or all of the characteristics of a video program. Accordingly, a video advertisement may be described by the same physical characteristics used to describe a video program.

An advertisement may be a video or a static advertisement. Video advertisements may be animated. An advertisement may include text, graphics, video, audio, links, and executable code and scripts. Advertisements may be formatted for display at a specific type of client 6. For example, an advertisement may be formatted to display in a frame within a Web browser of a client 6. As another example, advertisements directed to a video program may be presented "in-stream" as the video program is played in a video player. In an embodiment, in-stream advertisements may replace the video program in a video player for a period of time or may be inserted between portions of the video program. An in-stream advertisement may be pre-roll (before the video program), post-roll (after the video program), or interstitial (at a break in the video program). An in-stream advertisement may include video, audio, text, animated images, still images, or a combination thereof. The advertisement may appear in the same form as the video program, as an overlay to the video program, or in other forms. The advertisement may appear only after a link in or associated with the video program is activated.

The content provider 2 may transmit information to the advertiser 4 about how, when, and/or where the advertisements are to be rendered, and/or information about the results of that rendering such as where the ad spot appears on a Web page, whether the advertisement is required to be clicked in order to display or play, length of time for the ad spot, volume, and other physical details, for example.

As noted above, video programs and video advertisements may be served on a resource such as a Web page when that Web page is loaded and rendered at a media device such as a lap top computer (i.e., at a client 6). The computer typically has installed thereon a browser, which is a software program that allows the computer to connect to and acquire content (i.e., Web pages) from a Web server. A Web page may display static images, including text, and moving images, including videos and animations. Video programs displayed by way of a Web page may be short, on the order of seconds, to long, such as for a full-length feature film.

The video programs may be provided on a search results Web page. A Web site visitor submits a search query, for example, "movie trailers 2012," to a search engine, and the search engine returns a number of movie trailers on the search results Web page. When the search results Web page is rendered at the Web site visitor's media device, the displayed movie trailers may be represented by a static image, for example, a first frame of the movie trailer. The Web site visitor then clicks on one of the movie trailers, and the video program begins. In some examples, only the first portion of the movie trailer is buffered in the Web site visitor's media device, and the remaining portions then are streamed to the media device. The search results Web page also may display a number of advertisements. The advertisements may be static (e.g., a banner ad) or video advertisements.

Video advertisements may be included in a separate section of the Web page or may be included with a specific video program. For example, a sports video clip may play, but may be preceded by a video advertisement. Some video advertisements auto play, some may auto play, but may be stopped and discarded after a set time, such as five (5) seconds, and some may require the Web site visitor to click on the video advertisement to initiate play. As noted above, some video advertisements that accompany a video program may play before the video program plays; these may be called pre-roll video advertisements. Other video advertisements play periodically during the course of playing the video programs; in this respect, the video advertisements are akin to commercials shown in broadcast television. Other video advertisements may play at the end of the video program. Some auto play video advertisements begin play when the Web page loads and is rendered. Some video advertisements only play when the Web site visitor clicks on the video advertisement.

Companies providing video advertisements may prefer to pay only for those video advertisements that actually are watched. Thus, when a video advertisement is served on a Web page, but does not play, or has its play stopped by action of the Web site visitor, a company may prefer not to be charged. That is, a company may prefer a advertising basis that is more akin to the CPC basis typically used for static advertisements. Correspondingly, a Web site publisher may want to increase revenue by a combination of video advertisements that actually play. For example, a Web site publisher may derive more revenue if five one-minute video advertisements play than if one five-minute advertisement plays. Accordingly, both the company and the Web site publisher may want a mechanism that accurately determines if a video advertisement has played. In addition, the Web site publisher would like to select video advertisements that have a high probability of being played; that is, video advertisements that have a high interestingness factor. Furthermore, the Web site publisher may want a mechanism that "packs" the greatest potential revenue into a Web page by, for example, increasing the number of video advertisements that may be displayed while the web page is being viewed by the Web site visitor. The herein disclosed systems and methods address these concerns of companies and Web site publishers, and thus provide distinct advantages over advertisement selection and pricing mechanisms such as a max bid auction system.

The discussion that follows focuses on video advertisements as presented on Internet Web pages. However, similar concepts apply equally to other forms of online content delivered at other types of online resources. For example, the systems and methods apply to video advertisements served with applications executing on mobile media devices such as tablets and smartphones; video games played on a dedicated fixed or mobile game player, or on a lap top computer, tablet, or smartphone; and other online content and online resources.

In one aspect, the systems and methods enabled thereby consider information that has been gathered about how a Web site visitor has interacted with a video advertisement. The interaction information may be gathered by the system or by a third party. This interaction information may be used to provide insight into how interesting a video advertisement is. The interaction information may be derived from a number of metrics, including, for example: "video watch rate", "video completion rate", "video stopped in the middle", "actions performed after the video", and "video watched multiple times by the same individual". All of these metrics may be used to determine a video advertisement interestingness factor (IF), which may be used to rank video advertisements according to a RANK (IF) algorithm, described below. Using this interestingness factor to designate or select a video advertisement to be served on a particular Web page may increase the chances that a Web site visitor actually will watch the video advertisement when it is served. As discussed below, this means the Web site publisher may see higher revenue because companies typically pay for CPM of video advertisements that actually play. Thus, in the context of a video advertisement, the interestingness factor (IF) is a measure of the probability of a video advertisement being played, and its value could be a product of some or all the aforementioned metrics or a linear/non-linear combination of the metrics, depending, for example, on which metrics are more important to the Web site publisher.

In another aspect, the systems and the methods enabled thereby consider certain physical characteristics or playback features of the video advertisements when determining which video advertisements to serve on a particular Web page. As used herein, a physical characteristic or playback feature of a video advertisement may be directly and objectively-measurable by a non-human (e.g., electronic) measurement device and does not rely on evaluation by a human to determine its value. For example, the length of a video advertisement may be determined by operation of a clock. While a human may operate the clock (e.g., start a stop watch), the human does not directly measure time; rather, the clock measures time. Other examples of playback features include audio level measured by an audio meter, and sharpness, color, and contrast, measured by a suitably programmed image processor. In contrast to these playback features, the subject matter of a video advertisement may be determined by subjective evaluation by a human. For example, a human may express the subject matter in terms of genre and other non-objective criteria.

One of the playback features is the length of the video advertisement. Furthermore, length of a video advertisement may be more or less significant depending on the type of media device displaying the video advertisement. For example, a Web site visitor watching a video advertisement on an Internet-enabled television (iTV) may be more willing to sit through the entire advertisement than he would if viewing the video advertisement on a smartphone. Furthermore, video advertisements for mobile applications tend to refresh after a specified time. In addition, watching video advertisements that are too long may cause fatigue to the Web site visitor, or loss of interest. After all, the Web site visitor's primary purpose in accessing a Web site likely is not to view advertisements, but rather to view other content that is the subject of that Web site. Still further, when a video advertisement plays, all other Web page activity stops. If the Web site visitor only has X amount of time to devote to viewing a Web page and ½ X is taken up with a video advertisement, the Web site visitor may become annoyed and move away from the Web page so that no other revenue may be generated as a result of the visit. Thus, shorter video advertisements may be more effective for mobile media devices, while longer video advertisements may be acceptable for fixed media devices.

As a consequence of video advertisement length effect on Web page viewing metrics, the herein disclosed systems and methods may take video advertisement length into account when selecting a video advertisement to serve with a Web page. For example, if two video advertisements have the same value for a maximum bid, then the shorter video advertisement may be selected since the Web site visitor then may return to his original viewing experience on the Web page and, moreover, may be able to view additional video advertisements. The length of the video advertisement may be accounted for in an alpha ($\alpha$) parameter of a RANK (IF) algorithm: RANK (IF)=$\alpha \times$IF$\times$max.bid, which is described below.

Another playback feature that may be measured, evaluated, and used in selecting a video advertisement to serve on a Web page is the type and level of audio that accompanies the video advertisement. For example, a "noisy" video advertisement may annoy a Web site visitor, who then may mute the advertisement, stop its play, if possible, or just elect to watch fewer video advertisements. Video advertisements that are classified as noisy may have a lower alpha ($\alpha$) value.

Still another playback feature that may be measured, evaluated, and used in selecting a video advertisement to serve on a Web page is the sharpness of the video. Video advertisements that are sharp are more pleasing to the eye and may convey their intended message more effectively. Again, sharpness is a characteristic that may be measured electronically and may be reflected in the alpha ($\alpha$) value. Other playback features that may be measured electronically also may be included in the RANK (IF) algorithm.

In still another aspect, the herein disclosed systems and methods, in evaluating and selecting a video advertisement, may take into account the specific type, make, and/or model of media device on which the Web page will be rendered. For example, the systems may detect that a media device is a smartphone as opposed to a tablet or an iTV. Some video advertisements may not be effective when displayed on a smartphone. For example, some video advertisements, because of their length, contrast, or audio may best be displayed on a fixed media device such as an iTV in an indoor setting. Thus, an advertiser may prefer not to have certain video advertisements served on a Web page rendered on a roaming smartphone. As with the playback features of a video advertisement, this feature may be accounted for in the alpha ($\alpha$) value.

The methods executed by the herein disclosed systems may involve use of information that in some respect identifies a device the Web site visitor uses to access the television programming. For example, when a Web site visitor uses an Internet browser to access a Web site, a Web server may create a random identification (ID) that identifies the browser and may cause the random ID to be stored on the Web site visitor's device.

In situations in which the systems disclosed herein collect personal information about Web site visitors, or may make use of personal information, the Web site visitors may be provided with an opportunity to control whether programs or features collect Web site visitor information (e.g., information about a Web site visitor's social network, social actions or activities, profession, a Web site visitor's preferences, or a Web site visitor's current location), or to control whether and/or how to receive advertisements from an ad server that may be more relevant or of interest to the Web site visitor. In addition, certain data may be treated in one or more ways before it is stored or used, so that personally identifiable information is removed. For example, a Web site visitor's identity may be treated so that no personally identifiable information can be determined for the Web site visitor, or a Web site visitor's geographic location may be generalized where location information is obtained (such as to a city, ZIP code, or state level), so that a particular location of a Web site visitor cannot be determined. Thus, the Web site visitor controls how information is collected about the Web site visitor and used by a server.

Figure 1B:
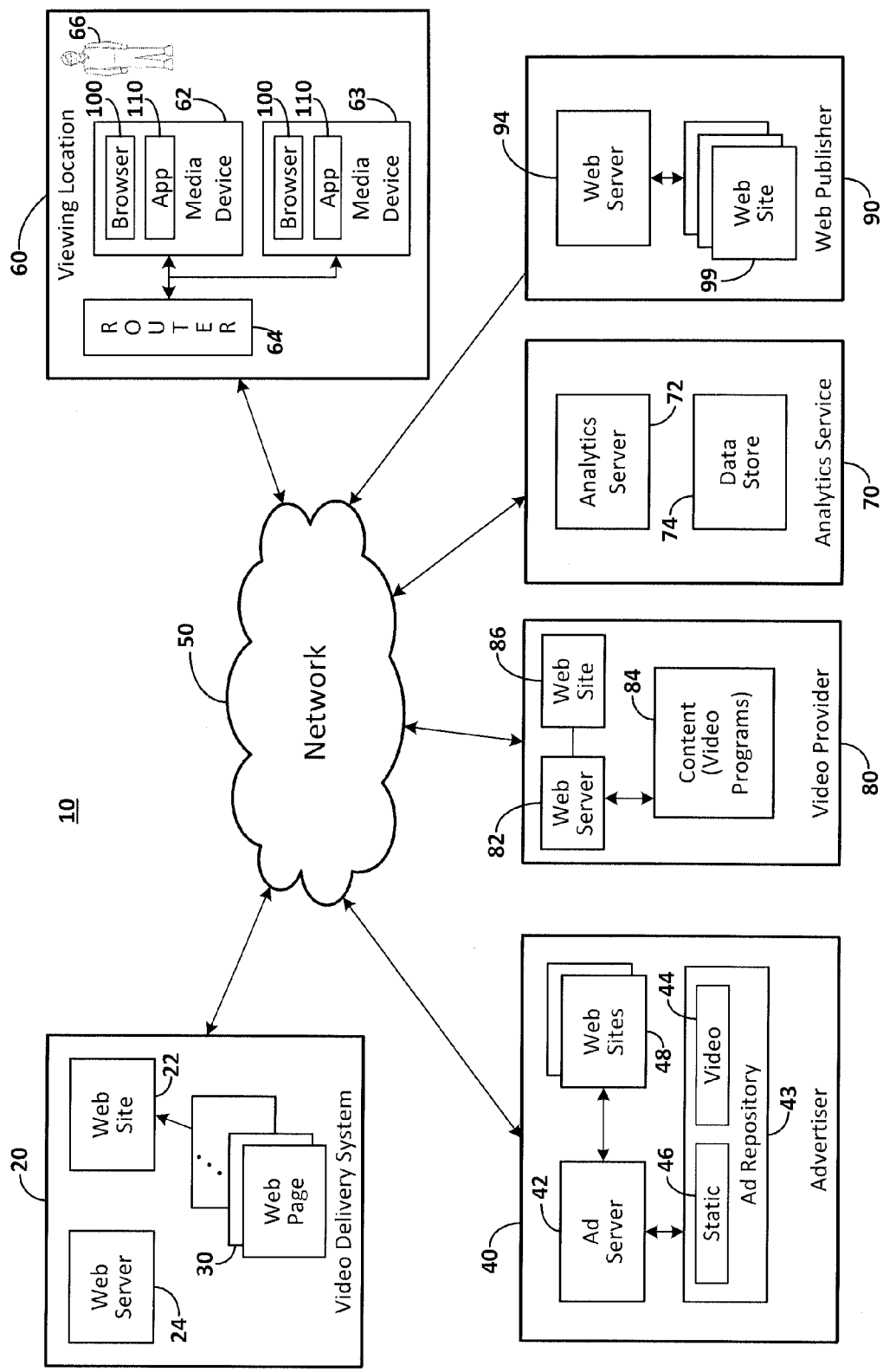

FIG. 1B illustrates a more detailed view of an environment similar to that of FIG. 1A, and in particular illustrates aspects of an environment that supports improved revenue generation through serving of video advertisements implemented for a video delivery system. In FIG. 1B, environment 10 includes video delivery system 20, advertiser 40, viewing location 60, analytics service 70, video provider 80, and Web site publisher 90, all of which communicate over network 50. Although FIG. 1B shows these entities as separate and apart, at least some of the entities may be combined or related. For example, the video delivery system 20 and analytics service 70 may be part of a single entity. Other combinations of entities are possible.

The video delivery system 20 operates video Web site 22. The Web site 22 is hosted on Web server 24. The Web site 22 includes Web pages 30. The Web site 22 may include Internet search features that allow Web site visitors 66 to search for video programs and other content displayed by the Web server 24 on the Web pages 30. The Web pages 30 may display search results, namely content segments such as video programs, as well as video advertisements, static advertisements, and other information. Some advertisements may provide links to other Web pages where video advertisements are displayed. The Web server 24 may provide links to enable navigation among the Web pages 30. The Web server 24 also may display, on any of the Web pages 30, links to other Web sites. The Web site 22 may display video advertisements created and provided by advertiser 40, and video programs created by Web site visitor 66, video provider 80, and other entities. The Web server 24 may incorporate components of a video advertisement selection system that improves serving of video advertisements on the Web pages 30. Example components of the video advertisement selection system are described with respect to FIG. 3. As an alternative to implementation on the Web server 24, at least some components of the video advertisement selection system may be implemented at another back-end server such as at the analytics service 70.

The Web pages 30 may display search results in response to a search query submitted by Web site visitor 66. For example, a Web page 30 may display several video programs that satisfy a search query. Each such video program may be assigned a unique identification (ID). The Web pages 30 also may display one or more static or video advertisements. The Web site visitor 66 may be more interested in the displayed advertisements when the displayed advertisements have some relationship to the content of the video programs appearing on the Web page 30. Thus, one aspect of selecting a video advertisement may be to match keywords derived from the video advertisement with keywords that relate to the content of the video program, That is, serving of advertisements on a video Web page 30 may be improved when the advertisements are served based on the content of the video programs. For example, video advertisements for polar bear tours in Churchill, Manitoba may be more appropriate when served with video programs about Arctic life than for video programs about the Amazon.

The advertiser 40 operates ad server 42 to provide video advertisements 44 and static advertisements 46 that are served at the Web pages 30, and that may be stored in ad repository 43. The advertiser 40 may be or may represent a single company or entity, a group of related companies, or a group of unrelated companies (e.g., the advertiser 40 may operate as an ad broker). In an embodiment, the advertiser 40 may operate an online advertising network. In an embodiment, the advertiser 40 and the video delivery system 20 are part of the same entity. The advertiser 40 may operate the ad server 42 to provide one or more Web sites 48. The video advertisements 44 may include audio, video, and animation features. The video advertisements 44 may be in a rich media format. The advertiser 40 may provide an advertising campaign that includes both static and video advertising. The static advertisements and video advertisements may complement each other; that is, the static advertisements and the non-static advertisements may be related to the same product or service. The video advertisements 44 may be displayed on a Web page 30 at the same time that a video program is being displayed on the Web page 30. The video advertisements 44 may be shown as a video overlay of a video program, before and/or after display of a video program, and during pauses in the video program. The video advertisements 44 may be served in specific locations of the Web page 30 while the video program is displayed in a different location of the Web page 30. The video advertisements 44 may change during display of a video program.

The video advertisements 44 may include links to other Web pages and other Web sites, including Web sites 48. For example, a video advertisement 44 for a car may be represented on Web page 30 as a static image that includes a link to a car manufacturer's Web site. A Web site visitor 66 viewing the static image at the Web page 30 may "click" on the advertisement 44 and be redirected to the car manufacturer's Web site 48 where the actual video advertisement is played.

The network 50 may be any communications network that allows the transmission of signals, media, messages, voice, and data among the entities shown in FIG. 1B, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wireline or a wireless link. While illustrated as a single or continuous network, the network 50 may be divided logically into various sub-nets or virtual networks, so long as at least a portion of the network 50 may facilitate communications among the entities of FIG. 1B.

The viewing location 60 may be the residence of an individual, such as Web site visitor 66, who operates media devices 62 and 63 to access, through router 64, resources such as the Web sites 22. The viewing location 60 may change with time, for example, when the Web site visitor 66 changes his location. The media devices 62 and 63 may be fixed or mobile. For example, media device 62 may be an Internet connected "smart" television (iTV); a "basic" or "smart" television connected to a set top box (STB) or other Internet-enabled device; a Blu-ray™ player; a game box; and a radio, for example. Media device 63 may be a tablet, a smartphone, a lap top computer, or a desk top computer, for example. The media devices 62 and 63 may include browsers, such as browser 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 110. The Web site visitor 66 may cause the media devices 62 or 63 to execute an application 110, such as a mobile banking application, to access online banking services. The application 110 may involve use of a browser or other means, including cellular means, to connect to the online banking services. Other applications may include game applications. The game applications may include provisions for serving video advertisements during the play of the game. Once connected to the Web site 22, the media devices 62 and 63 may allow viewing of content such as video programs and static images generated by entities such as the video provider 80 and displayed on the Web pages 30 at the Web site 22. The video programs and static images may include slots or spaces into which content segments such as advertisements may be placed. When such a video program or static image is to be viewed on the media devices 62 or 63, the Web server 24 may send an advertisement (ad) request, which is received at the advertiser 40, and which may be answered with an advertisement 44.

The Web site visitor 66 may access the Web site publisher 90 to use a social networking Web site, a blog Web site, including a personal blog Web site and/or a commercial blog Web site, and other Web sites.

The Web site visitor 66 may operate the media devices 62 and 63 to communicate through the network 50 directly to the analytics service 70. For example, an application on the media device 62 may be a game. The individual game moves (clicks) made by the Web site visitor 66 in playing the game may be sent directly to the analytics service 70 by the media device 62. For example, when paying a video word game (i.e., application 110), the Web site visitor may type in a word based on a set of available letters and "hit" an "enter" button. In response, the application 110 may send an ad request to the ad server 42. The ad server 42 may respond by sending a video advertisement to the media device 62. If the Web site visitor 66 elects to view the video advertisement, the browser 100 in the media device 62 may send an advertisement played signal directly to the analytics service 70. Alternately, the advertisement played signal may be sent to the ad server 42, and the ad server 42 sends a corresponding signal to the analytics service 70.

The analytics service 70 includes analytics server 72. The analytics service 70 may operate in conjunction with Web site operators to collect, analyze, and report information and data related to visits to Web sites and viewing of video advertisements by Web site visitors 66. The analytics service 70 may be part of the video delivery system 20, or the advertiser 40, or may be a separate entity. The analytics service 70 collects, analyzes, stores (in data store 74), and reports on data and information related to visits to the Web site 22, operation of applications, and other reported activity. In an embodiment, as is described with respect to FIG. 3, the analytics service 70 may operate system 300 to collect Web site information that may be used to improve serving of video advertisements in the video delivery system 20 or at a Web site operated by Web site publisher 90.

The video provider 80 provides content, in the form of video programs 84, which may be displayed on the Web pages 30 and viewed and/or heard by the Web site visitor 66 using the media devices 62 and 63. In an embodiment, the video provider operates, using Web server 82, video sharing Web site 86, and may embed the videos 84 on the Web site 86.

The Web site publisher 90 operates Web sites 99 using Web server 94. The Web sites 99 may include those on which Web site visitors 66 may provide comments, upload videos, and upload images. The Web sites 99 may include social networking Web sites. The Web service provider 90 may operate a Web hosting service, and the Web sites 99 may be personalized for and used by individuals, such as the Web site visitors 66.

Figure 2A:
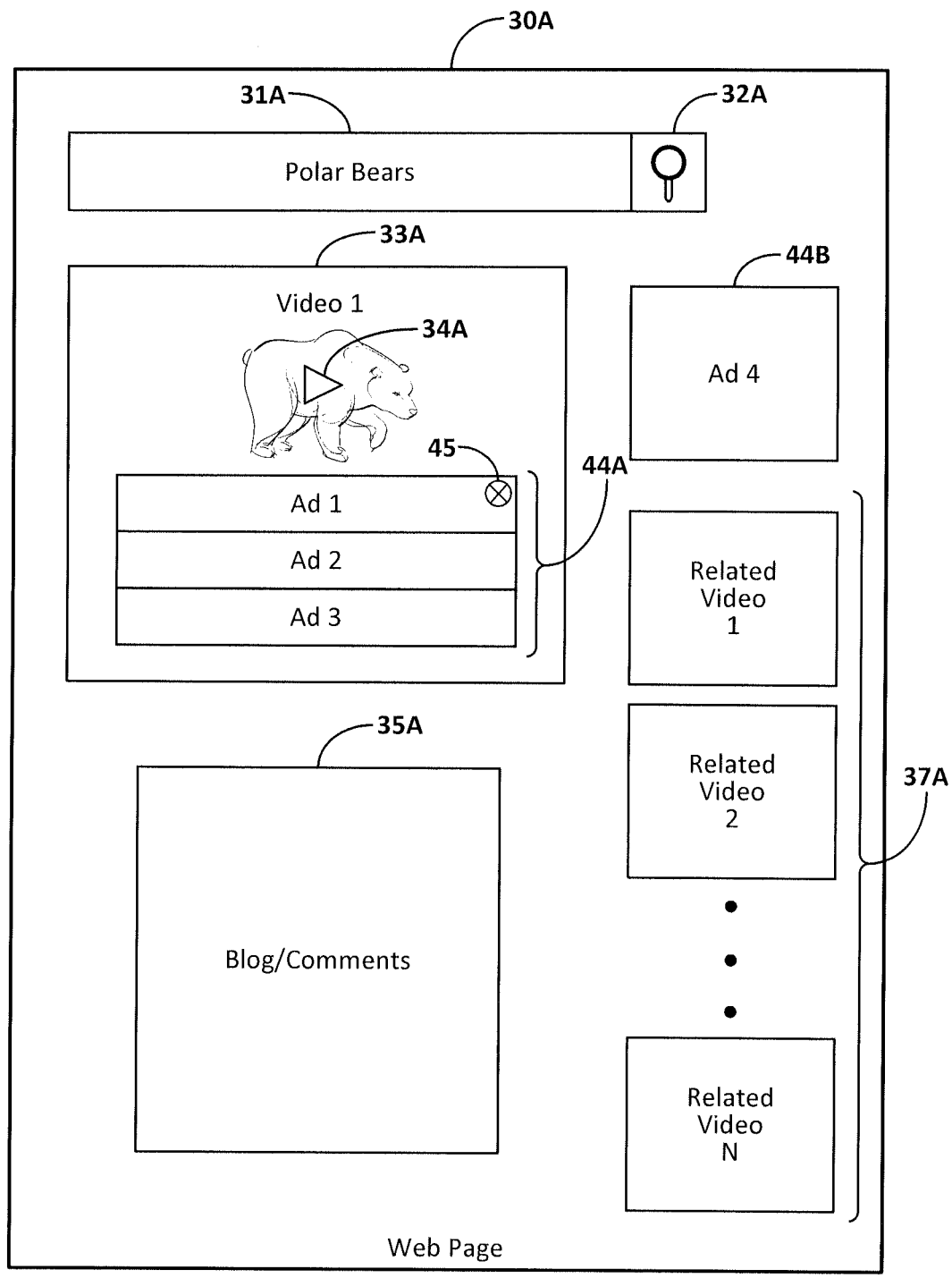
FIGS. 2A-2C illustrate example online resources at which are served video content segments.
Figure 2B:
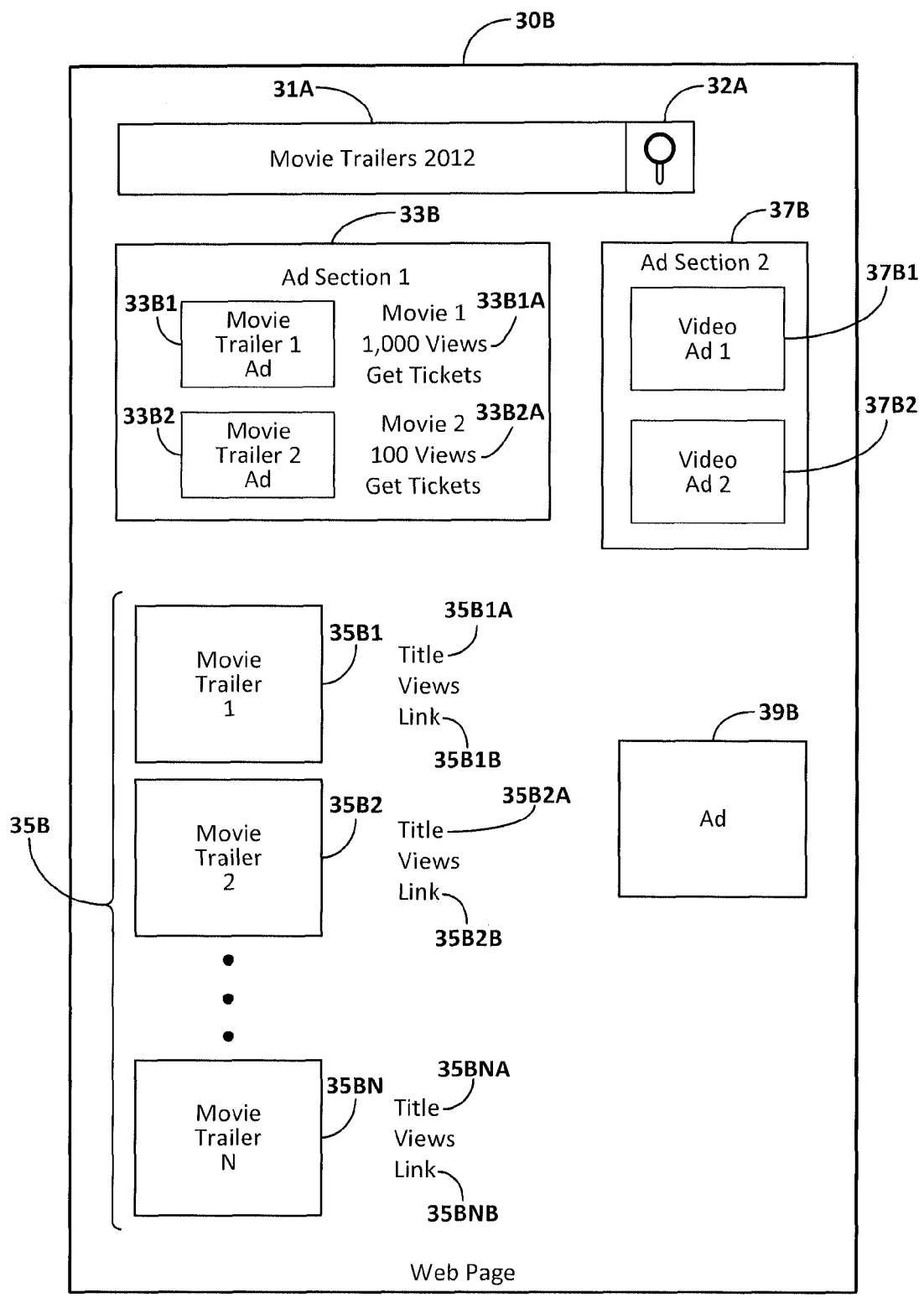
Figure 2C:
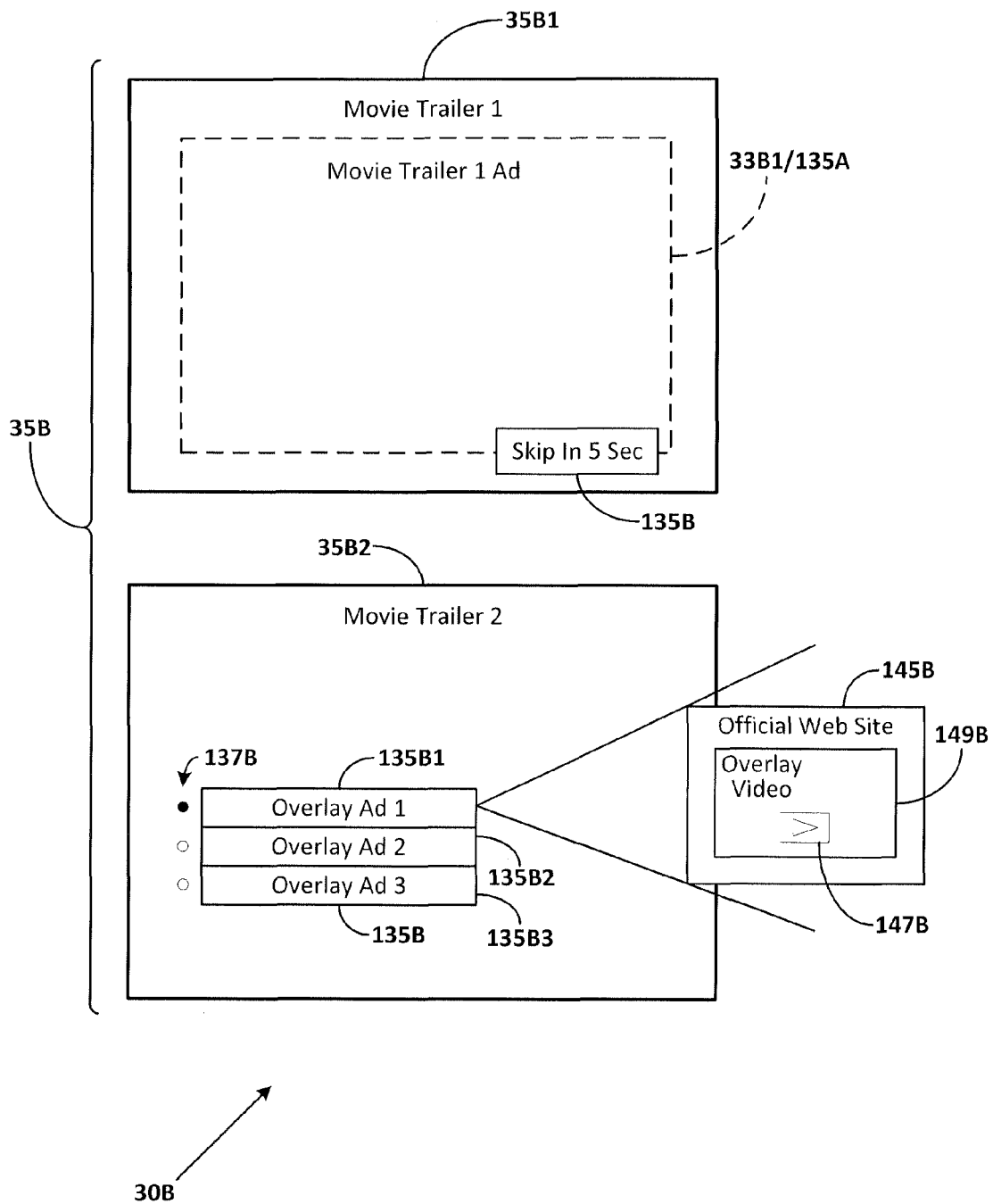

FIGS. 2A-2C illustrate examples of Web pages on which video programs may be displayed and on which may be served video advertisements or links to video advertisements.

FIG. 2A illustrates an example Web page displaying results of a search query for polar bear video programs. In FIG. 2A, Web page 30A includes search query window 31A in which Web site visitor 66 has entered a search query for polar bears. The Web site visitor 66 initiates the search by pressing search button 32A, which has a magnifying glass icon. A search engine returns a polar bear video program 33A and related video programs (1-N) 37A. The related video programs may be additional polar bear videos, videos about Arctic life, nature videos, and similar themed video programs. The Web page 30A also provides a blog/comments section 35A in which Web site visitors 66 may post comments about the video program 33A, rate the video program 33A, and provide comments in response to comments of other Web site visitors 66. The video program 33A may begin play when the Web site visitor 66 clicks on play button 34A. Alternately, the video program 33A may begin playing automatically when the Web page 30A is loaded and rendered.

If the Web site visitor 66 chooses one of the related video programs 37A to watch, the chosen video program will be displayed in the same viewing location as the video program 33A.

The Web page 30A shows two advertisement areas. Advertisement area 44A overlays the video program 33A and includes three separate video advertisements, although fewer or more video advertisements may be included, and static advertisements may be included. The advertisement area 44A includes a close button 45 that the Web site visitor 66 may activate to close all advertisements in the advertisement area 44A. In an embodiment, the first video advertisement may begin play prior to playing the video program 33A. Alternately, the advertisements may play only when clicked on by the Web site visitor 66. Once a video advertisement has begun playing, the Web site visitor 66 may be able to close the video advertisement before end of play. Alternately, the Web site visitor 66 may not be able to close the video advertisement. In yet another alternative, the Web site visitor 66 may close the video advertisement after it has played a pre-determined time, such as five (5) seconds. In still another embodiment, the advertisements are represented by links in the advertisement area 44A, and the Web site visitor 66 may activate a link to navigate to a separate Web page displaying the video advertisement.

Advertisement area 44B displays an advertisement that includes a link to another Web page. If the Web site visitor 66 clicks on the advertisement contained in area 44B, the Web site visitor's browser will navigate to the address identified in the link.

Note that the Web page 30A may incorporate many other types of video advertisements and mechanisms for their display. For example, the video program 33A may be interrupted to show another video advertisement.

FIG. 2B illustrates an example search results Web page on which are displayed search results for a query for movie trailers. In FIG. 2B, Web page 30B includes search query window 31B in which a Web site visitor 66 may enter a search query. In the example of FIG. 2B, the visitor 66 has entered "movie trailers 2012" as the search query. Search button 32B, which shows a magnifying glass icon, is used to initiate execution of the search. The Web page 30B includes search results area 35B in which are displayed, as search results, movie trailers 35B1-35BN. Each movie trailer includes additional data, or metadata, such as a title 35BxA (x is a variable 1-n), number of views 35BxB, and a link 35BxC. Activating the link 35BxC may cause the browser 100 to navigate away from the Web page 30B to another Web page connected to the link.

The example Web page 30B includes three ad sections. A first ad section 33B, which is displayed at a prominent (i.e., top) part of the Web page 30B, includes two video advertisements. The two video advertisements illustrated also are movie trailers and associated metadata, although other video advertisement types may be displayed in the ad section 33B. Thus, movie trailer 33A1 and its associated metadata 33A1A is a first video advertisement and movie trailer 33B2 and its metadata 33B2A is a second video advertisement. The metadata associated with these advertisements may include a movie title, the current number of views, and a link, "Get Tickets". In another embodiment, the metadata may provide a link to see further information including additional trailers for the movies.

A second ad section 37B includes video advertisements 37B1 and 37B2. These video advertisements may include a movie trailer, a video for an automobile, or a video from a video game, for example. Finally, ad section 39B may be a static advertisement. The video advertisements 37B1 and 37B2 and static advertisement in ad section 39B may include links to associated Web pages.

The video advertisements 33B1, 33B2, 37B1, and 37B2 on the Web page 30B may start only when a visitor 66 clicks on the video advertisement.

FIG. 2C illustrates the Web page 30B in more detail. In FIG. 2C, Movie trailer section 35B is illustrated showing movie trailers 35B1 and 35B2. When the browser 100 renders Web page 30B, movie trailers 1 and 2 show a single frame of the titled movie trailer. However, when a Web site visitor 66 clicks on movie trailer 1 (35B1), rather than immediately displaying the movie trailer, a "pre-roll" video advertisement 135A begins playing. The video advertisement 135A may be accompanied by a "skip ad" button 135B that allows the visitor 66 to skip the video advertisement 135 after it has played for a specified time such as five (5) seconds. In an embodiment, the video advertisement 135 is the same as video advertisement 33B1. That is, when the Web site visitor 66 selects movie trailer 35B1, video advertisement 135A (or 33B1) begins playing. At the conclusion of the video advertisement 135A, or if the Web site visitor 66 selects the skip ad button 135B, the movie trailer 35B1 begins playing.

Movie trailer 35B2 also includes embedded advertisements. However, the embedded advertisements differ from those of movie trailer 35B1. Instead of a pre-roll video advertisement, when the Web site visitor 66 selects movie trailer 35B2, what is displayed is overlay 135B, which in an example, is a menu of three advertisements, 135B1-B3. The Web site visitor 66 may then elect to view any of the video advertisements 135B1-B3, or to continue to view the movie trailer 35B2. In FIG. 2C, the Web site visitor 66 has elected to view overlay ad 135B1. By clicking on this overlay ad 135B1, the Web site visitor's browser 100 is directed to Web site 145B, which includes a video advertisement 147B. The Web site visitor 66 may elect to view the video advertisement 147B by clicking on play button 149B. The screen display of the Web site 145B initially may be "down sized", and the Web site visitor 66 may elect to maximize the screen display. When the Web site 145B is rendered, all video display on the Web page 30B stops, and remains stopped as long as the Web site 145B remains displayed either down sized or maximized. If the Web site 145B display is minimized, the video playing on the web page 30B (in this example, movie trailer 35B2) may resume. The display of the movie trailer 35B2 also may include status bar 137B that indicates which of the three overlay advertisements currently is selected.

Figure 3:
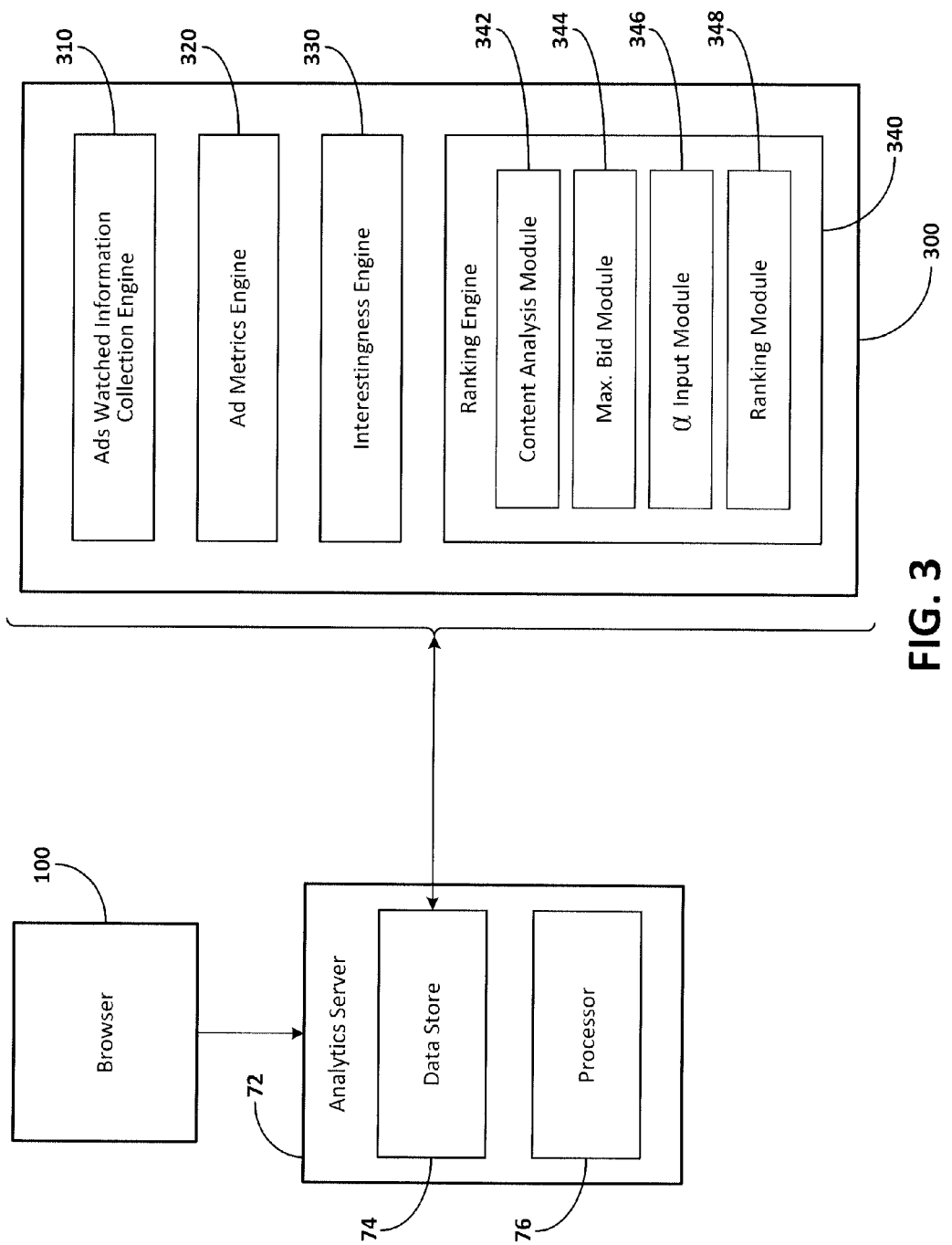
FIG. 3 is a block diagram of an example system that may increase revenue through the display of video content segments.

FIG. 3 is a block diagram of an example video advertisement selection system that may increase revenue through the display of video advertisements. FIG. 3 shows video advertisement selection system 300, which, in this example, is implemented on analytics server 72. The analytics server 72 includes data store 74 that stores the program code of system 300. The data store 74 is a non-tangible computer readable storage medium. Processor 76 access the data store 74 to load and execute the program code of the system 300. The analytics server 72 receives an input from browser 100 related to video advertisements watched through the browser 100 of, for example, media device 62. The input to, processing of, and output from the analytics server 72 is described below.

The system 300 includes an ads watched information collection engine 310, an ad metrics engine 320, an interestingness engine 330, and a ranking engine 340. The engine 310 receives video ads watched information collected by and sent from the browser 100, by way of processor 76. The engine 310 may correlate the information with an identification (ID) of a video advertisement (i.e., a video ad ID). All such video advertisements may include a unique ID. The engine 310 may store the ads watched information in the data store 74, along with the appropriate, unique video ad ID. The engine 310 may update the stored information in the data store 74 as more ads watched information is received from the browser 100. The engine 310 may process some of the received information prior to storage. For example, the engine 310 may average newly received information with that currently stored in the data store 74, and store the newly averaged values in the data store 74.

The ad metrics engine 320 performs further processing and computations on the data stored in the data store 74. For example, the metrics engine 320 may compare values received for length of video ads watched and compare this length to a threshold. Then, the engine 320 may compare the actual watched length of a video advertisement to a threshold to determine if the video advertisement should be included as a "watched" video advertisement. The engine 320 also may apply weights to one or more of the collected ad metrics. The weights may be provided by a Web site publisher or advertiser, for example. The weights may be adjusted over time to optimize the weightings. For example, weights may be determined from experimentation and empirical analysis of performance of video advertisements placed using different weights. As another example, a machine learning process may be used to analyze the video advertisement performance and adjust weights without manual intervention.

The interestingness engine 330 computes a total interestingness factor (IF) or value from the data processed by the ad metrics engine 320. The engine 330 may execute a normalization process to account for the fact that not every video advertisement will have the same video metrics.

The ranking engine 340 includes content analysis module 342, max.bid module 344, alpha ($\alpha$) input module 346, and ranking module 348.

The content analysis module 342 determines if an advertisement is suitable for an advertisement availability based, for example, on analysis of keywords derived from the availability and keywords provided by the advertiser 40 for the advertisement. That is, the module 342 identifies candidate advertisements from a pool of available advertisements to serve in response to an advertisement request. One criterion for identifying candidate advertisements may be the content (e.g., subject matter) of a video program to be displayed on a Web page. The video program may have associated metadata specifying one or more topics or concepts. Another criterion may be the overall content of the Web page itself. Yet another criterion may be topical or concept information for the video program contained on the Web page. The video program may be retrieved by the analytics service 70 from the video delivery system 20 and analyzed by the content analysis module 342. One or more topics or concepts to which the video program is relevant may be determined from the analysis. The content of a video advertisement then is compared to the topics or concepts of the video program. The topics and concepts may be expressed in keywords. For example, topical keywords of a video program may be compared to topical keywords of a video advertisement using, for example, keyword detection and analysis, and a score may be determined from the comparison. If the score exceeds a threshold, for example, the video advertisement may be identified as a candidate for an auction to select video advertisements to serve on the Web page.

In an embodiment, topical keywords for a video program may be determined using search engine data. For example, data related to interactions to a video program by Web site visitors 66 who were directed to the video program by a search query may be an indication of whether the search query is a good topical keyword for the video program. Interactions with the video program may include watching the video program in its entirety, watching the video program repeatedly, fast-forwarding or advancing the video program, or skipping the video program. A search engine may collect the query and interaction data anonymously and the advertiser 40 or analytics service 70 may analyze the data to determine if a search query is a good keyword for the video program. For example, on the one hand, if Web site visitors 66 who accessed a video program through a search query tended to skip the video program, then the search query may be determined to be a poor keyword for the video program. On the other hand, if the Web site visitors 66 tended to watch the video program, or to watch the video program repeatedly (during one or multiple Web site visits), the search query may be determined to be a good keyword for the video program. Good keywords may be associated with the video program and may be compared to the keywords for the video advertisements.

The max.bid module 344 receives bids from various advertisers for advertisement availabilities. The bids may include a base bid and bid increments. Bids may change based on the location of an advertisement slot in a Web page, the length of the advertisement slot, and other factors. In an embodiment, an advertiser 40 may enter a base bid and any number of bid modifiers. An example of a bid modifier is a decrease of $0.50 from the base bid if the video program allows skipping of advertisements. Another example of a bid modifier is a decrease of $0.50 from the base bid if the video program does not allow pre-roll advertisements. These modifiers allow an advertiser 40 to fine tune its bid based on the advertiser's value of an ad placement under various conditions.

An advertiser 40 also may modify its bid based on the type of media device on which the video program will be displayed.

The alpha ($\alpha$) input module 346 receives inputs from the advertiser 40 and/or Web site publisher (e.g., the video delivery system 20). The alpha ($\alpha$) input module also may include as an input, the actual, as opposed to watched, length of a video advertisement. The alpha ($\alpha$) input module 346 may assign a higher score to video advertisements having a shorter duration, on the assumption that when a video advertisement is short, the Web site visitor 66 may have more time to view other video advertisements, and the more video advertisements that count as watched, the higher the revenue that may be generated by displaying a Web page. The alpha ($\alpha$) input module 346 also may account for other video playback features such as the normalized volume of the video advertisement, contrast of the video advertisement, and other physical factors (PF). In an embodiment, the alpha ($\alpha$) input module 346 may compute alpha ($\alpha$) as a combination of Playback Features (PF)

$$(\alpha) = \text{Length Factor (LF)} \times \text{Noise Factor (NF)} \times \text{Contrast Factor (CF)} \times \ldots \times \text{Playback Feature}_n \text{ (PF}_n\text{)}.$$

In another embodiment, the alpha ($\alpha$) input module 346 may compute alpha ($\alpha$) as a combination of Playback Features (PF)

$$(\alpha) = \text{Length Factor (LF)} + \text{Noise Factor (NF)} + \text{Contrast Factor (CF)} + \ldots + \text{Playback Feature}_n \text{ (PF}_n\text{)}.$$

Other linear and non-linear combinations of terms are possible when computing alpha ($\alpha$).

In an embodiment, as noted above, the Web site publisher (e.g., the video delivery system 20) may assign values to these Playback Features (PFs). For example, a 20-second video advertisement may be assigned a LF of 2.0 and a 60-second video advertisement may be assigned a LF of 1.5.

The ranking module 348 executes a rank algorithm 350 (RANK (IF)) to rank video advertisements. The rank algorithm 350 may be of the form:

$$\text{RANK (IF)} = \alpha \times \text{IF} \times \text{max.bid}.$$

However, the RANK (IF) may be computed as a sum of the above terms rather than a product of the terms, may use other terms, and may be computed as other linear and non-linear combinations of terms.

Following is an example of video advertisement watched metrics whose values may be collected by the browser 100 or may be provided by the advertiser/Web site publisher, and which may be used by the system 300 to rank video advertisements for service selection on a Web page:

Video plays—this is the number of plays of a video advertisement.

Video pauses/stops—this is the number of pauses without restart, and the number of stops of a video advertisement. A video advertisement may be stopped by operation of a stop button, closing a browser, opening a new tab, navigating to another Web page, and turning off the media device.

Video played length—this is the amount of time that the video advertisement actually played when in a viewable position in a media device/browser window. If a browser is minimized, the video advertisement may stop playing. If the browser is down-sized and the video advertisement is not visible, even if the video advertisement continues to play, the video played length may not be counted.

Video seeking—the number of times a visitor jumps to different times in the video by interacting with a progress bar.

Video replays—this is a number of times a video advertisement is replayed during a current Web page display.

Video noise level—this is the expected or design noise level of a video advertisement without considering operation of a mute button or operation of an audio level slide.

Video length—this is the actual length of a video advertisement in units of time.

Video full screen maximizing, downsizing, and minimizing—this is the size of the browser window during play of a video advertisement.

Video volume mute—this is muting of a video advertisement.

Visitor actions taken during play of a video advertisement—these actions include activating a link during play of a video advertisement.

Visitor actions taken after play of a video advertisement—these actions include activating a link after play of a video advertisement.

Some of the above metrics may be used in computation of the interestingness factor (IF) while other metrics may be included in the alpha (α) term of the RANK (IF) algorithm. In an embodiment, video advertisement length is included in the alpha (α) term.

Table 1 presents an example of video advertisement metrics data, weighting, and scoring executed by the system 300 for two video advertisements.

TABLE 1

| Video ID No. | Metric | Weight | Value | Interestingness Factor |
|---|---|---|---|---|
| 1 | Completion rate | +50 | 30% | 15 |
| 1 | Full screens | +20 | 60% | 12 |
| 1 | Mutes | −30 | 2% | −0.6 |
| V 1 Total | | | | 26.4 |
| 2 | Completion rate | +50 | 45% | 22.5 |
| 2 | Full screens | +20 | 10% | 2 |
| 2 | Mutes | −30 | 25% | −7.5 |
| V 2 Total | | | | 17 |

Note that Table 1 shows only a subset of the possible metrics. In Table 1, video ID 1 was viewed "to completions" 30 percent of the time, was watched "full screen" 60 percent of the time, and was muted 2 percent of the time. Video ID 1 has a total interestingness factor (IF) of 26.4 while video ID 2 has a total interestingness factor (IF) of 17. In an embodiment, the interestingness factor (IF) may be normalized to account, for example, for differences in the number of collected metrics. If all other factors used in the RANK (IF) algorithm are the same between video ID 1 and video ID 2, video ID 1 will be selected to serve on the Web page.

Figure 4A:
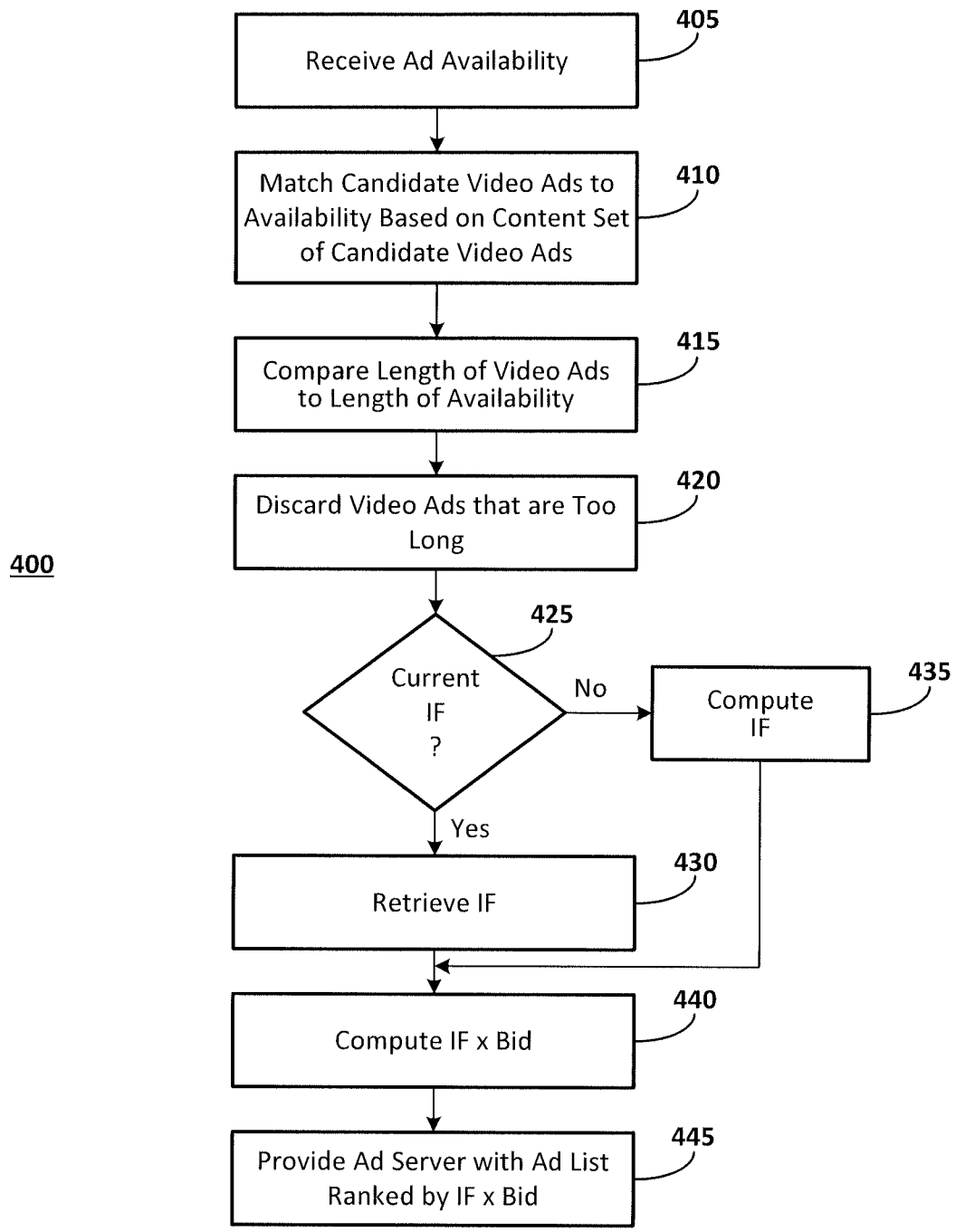
FIGS. 4A-4D are flowcharts illustrating example processes for selecting and serving video content segments in a manner that may increase revenue.

FIGS. 4A-4D are flowcharts illustrating example processes for serving video content segments in a manner that may increase revenue. In FIG. 4A, process 400 begins in block 405 when ad server 42 receives an advertisement availability (e.g., through an ad request) for a video advertisement to display on Web page 30. The advertisement availability may include one or more keywords that may be used to select an appropriate video advertisement. For example, the advertisement availability may include keywords from a search term submitted by a Web site visitor 66. The advertisement availability also may include a length, in units of time, for the advertisement availability. In block 410, the ad server 42 identifies video advertisements that match the keywords provided with the video advertisement availability to establish a first set of candidate video advertisements. In block 415, ad server 42 compares a length of each of the candidate video advertisements in the first set of candidate advertisements. In block 420, any candidate video advertisements having a length exceeding that of the advertisement availability are discarded to create a second set of candidate video advertisements. In block 425, the ad server 42 determines if a current interestingness factor (IF) exists for each of the advertisements identified in block 420. If a current IF exists, the ad server 42 retrieves the current IF in block 430. If a current IF does not exist, the process 400 moves to block 435 and, if the metrics data are available, the ad server 42 computes a current IF by a linear or non-linear combination of some or all of the metrics values. Alternately, the ad server 42 requests this computation from the analytics server 72 (see, e.g., process 450 described with respect to FIG. 4B). Following block 430 or 435, the process 400 moves to block 440 and the ad server 42, in an embodiment, executes a combination of at least the last two terms (i.e., IF×max.bid) of the RANK (IF) algorithm; in an another embodiment, the ad server 42 computes RANK (IF) by all three values (i.e., including alpha (α)). In block 445, the ad server 42 provides the Web server 24 with an ordered list of video advertisements according to the computed value of IF×max.bid along with the playback features of each video advertisement on the ordered list. Alternately, if RANK (IF) is computed in the ad server 42, the ad server 42 selects a video advertisement having a highest computed RANK (IF) and provides the advertisement to the Web server 22 to serve on the Web page 30.

Figure 4B:
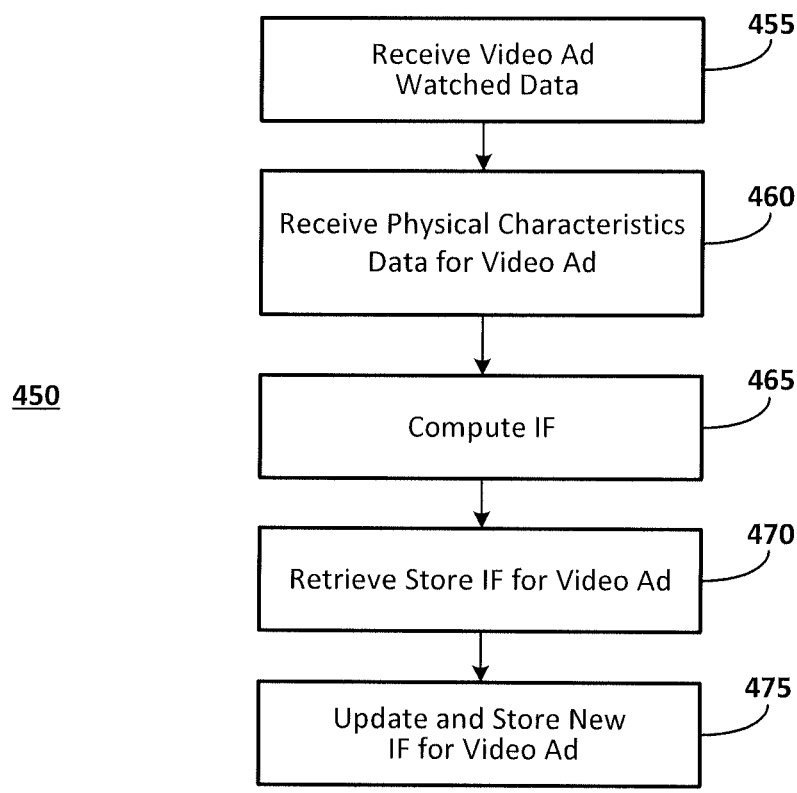

FIG. 4B illustrates process 450 in which analytics server 72 computes an interestingness factor (IF) for a video advertisement according to the RANK (IF) algorithm. In block 455, the analytics server 72 receives video advertisement watched data and a video ID for the video advertisement from browser 100. In block 460, the analytics server 72 receives playback features data (e.g., length, noisiness, contrast) from the ad server 42. In block 465, the analytics server 72 computes the interestingness factor (IF) according to previously determined weights for the video advertisement as identified by the video ID. In this embodiment, the IF is computed without using the playback features data; i.e., without including a value for the length of the video advertisement, for example. In block 470, the analytics server 72 retrieves previously stored value for IF for the video advertisement as identified by the video ID, and updates and stores the updated value for IF. In block 475, the analytics server verifies that the playback features have not changed for the video advertisement.

Figure 4C:
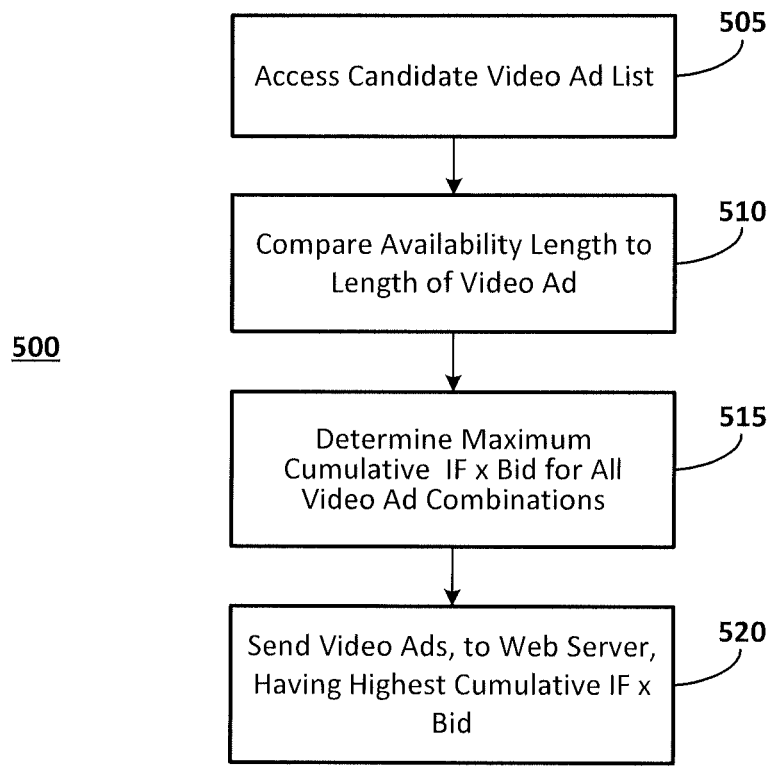

FIG. 4C illustrates an example process 500 to account for alpha (α) term of the RANK IF algorithm. As noted above, the alpha (α) term process may be executed by the ad server 42 or the Web server 24. In another embodiment, the analytics server 72 may execute the process 500. In FIG. 4C, process 500 is shown implemented on the ad server 42. In block 505, the ad server 42 accesses the list of candidate video advertisements ordered according to the value of IF×max.bid. In block 510, the ad server compares the length of the advertisement availability (e.g., 60 seconds) to the lengths of the candidate video advertisements. In block 515, the ad server 42 determines the maximum cumulative value of IF×max.bid for all possible combinations of video advertisements. For example, three 20-second video advertisements may have a cumulative IF×max.bid that is greater that a cumulative IF×max.bid for a 20-second video advertisement and a 40-second video advertisement. In block 520, the ad server 42 sends the video advertisements having the highest cumulative or collective IF×max.bid to the Web server 24 to serve on the Web page 30.

Figure 4D:
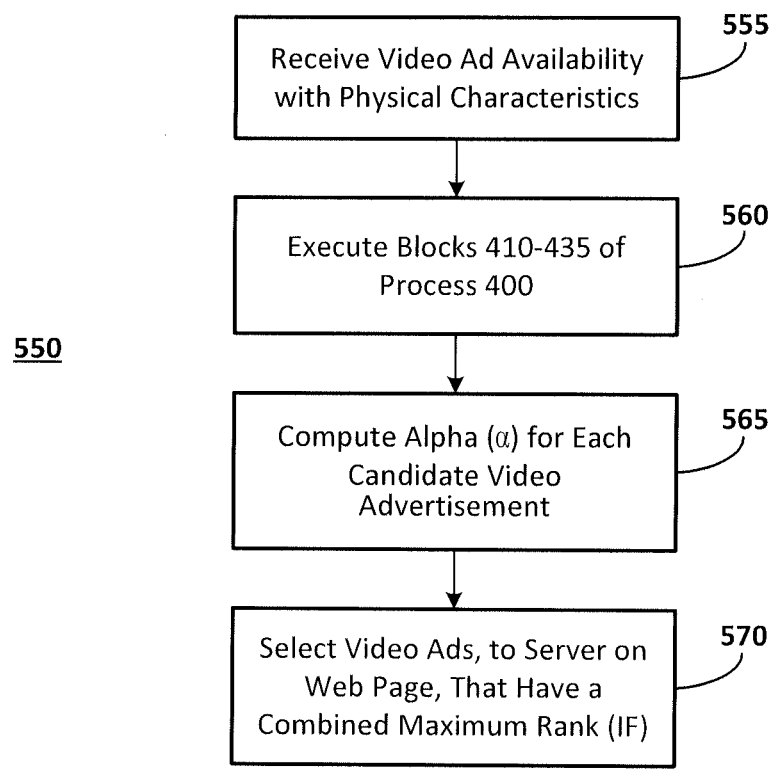

FIG. 4D illustrates an example process for selecting video advertisements based on computing RANK (IF). In FIG. 4D, process 550 begins in block 555 when ad server 42 receives a video advertisement availability from Web server 24. The availability specifies the total length of the video advertisements that may play in the availability, along with one or more Playback Features (PFs) provided by the Web server 24. For example, the Web server 24 could provide a length factor (LF) of 1.4 for a 20-second video advertisement, 1.2 for a 40-second video advertisement, and 1.0 for a 60-second video advertisement. Other PFs, including factors for noise and contrast, also may be provided. In block 560, the ad server 42 executes blocks 410-435 of the process 400 shown in FIG. 4A. In block 565, the ad server 42, given the PFs, computes an alpha ($\alpha$) value for each candidate video advertisements. In block 570, the ad server 42 computes RANK (IF) for each of the candidate video advertisements. In block 575, the ad server 42 selects the video advertisements having the combined maximum RANK (IF) values and provides these video advertisements to the Web server 24 to serve with the Web page 30.

As may be appreciated by reference to FIGS. 4A-4D, the selection of video advertisements to serve on a particular Web page may be an iterative process. For example, the value of max.bid may be replaced by a starting bid with incremental modifiers. As another example, the bid or auction process may results in lowering the actual bid amount of a selected video advertisement (i.e., a highest bid) to a value that is just one increment above that of the next highest bid.

As also may be appreciated by reference to FIGS. 4A-4D, the process for the selection of video advertisements, including the computation of the RANK (IF) algorithm, to serve on a particular Web page may be distributed over many different entities, or may be combined into one entity.

Certain of the devices and components shown in FIGS. 1A, 1B, and 3 include a computing system. The computing system and its components include the circuitry to perform the method steps of the claims that follow, and that are described with respect to FIGS. 4A-4D. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 4A-4D. The disclosed devices, components, and systems contemplate using or implementing any suitable technique for performing the steps illustrated. Thus, FIGS. 4A-4D are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method, executed on a processor, for maximizing revenue from serving a video content segment at an online resource, comprising:
   receiving, by the processor, a request for a video content segment having one or more playback features;
   identifying, by the processor, one or more candidate video content segments responsive to the request;
   computing, by the processor, a length factor (LF) for each candidate video content segment based on a duration of the candidate video content segment, a higher length factor (LF) corresponding to a shorter duration;
   computing, by the processor, an interestingness factor (IF) for each candidate video content segment, the interestingness factor (IF) representing the probability of the candidate video content segment being played and computed based on a number of video plays and one or more of a number of video replays, a number of video maximizes, and a number of link activations;
   receiving, by the processor, a bid for each candidate video content segment;
   generating, by the processor, for each of the candidate video content segments, a rank equal to the length factor (LF) times the interestingness factor (IF) times the bid;
   identifying, by the processor, one or more candidate sets of candidate video content segments, where, for each candidate set, the candidate video content segments in the candidate set collectively satisfy the one or more playback features, and
   selecting, by the processor, in response to the request, one of the candidate sets whose cumulative scores are higher than at least one other candidate set.

2. The method of claim 1, wherein the video content segments are video advertisements.

3. The method of claim 2, further comprising:
   computing interestingness factor (IF) for each of the video advertisements, comprising:
   receiving data indicative of one or more user interactions with a video advertisement;
   computing a weighted score for each of the one or more user interactions; and
   summing the weighted scores.

4. The method of claim 3, wherein the user interactions comprising pauses/stops, played length, replays, viewing screen maximizing, volume mute, and activating a link.

5. The method of claim 2, wherein the playback features further include an audio noise level and a contrast.

6. The method of claim 2, wherein the bid is one of a base bid plus one or more bid increments, and a maximum bid.

7. A method, executed on a processor, for maximizing revenue from video advertisements served at an Internet Web site, comprising:
   receiving, by the processor, a request for a video advertisement to serve at a web page, the video advertisement having playback features;
   selecting, by the processor, an initial set of candidate video advertisements responsive to the request based on content information derived from the Web page;
   ranking, by the processor, each candidate video advertisement in the initial set of candidate video advertisements, comprising:
      receiving a length factor (LF) for each candidate video advertisement based on a length of the candidate video advertisement, a higher length factor (LF) corresponding to a shorter duration,
      receiving an interestingness factor (IF) for each candidate video advertisement the interestingness factor (IF) representing the probability of the candidate video content segment being played and computed based on a number of video plays and one or more of a number of video replays, a number of video maximizes, and a number of link activations,
      receiving a bid for one or more of the candidate video advertisements, and
      computing RANK=LF×IF×bid for each of the one or more candidate video advertisements for which a bid was received; and
   selecting, by the processor, one or more of the ranked candidate video advertisements to serve at the Web page.

8. The method of claim 7, wherein receiving the interestingness factor (IF) comprises computing the interestingness factor by:
   receiving, by the processor, one or more metrics values based on data recorded from user interactions while watching a video advertisement;
   applying, by the processor, a weighting factor to each of the received metrics values;
   computing, by the processor, an interim interestingness factor based on the weighted metrics values; and
   normalizing, by the processor, the interim interestingness factor to produce the interestingness factor (IF).

9. The method of claim 8, wherein the processor received the metrics values from a browser displaying the video advertisement, and wherein the metrics values relate to one or more of pauses/stops, played length, replays, viewing screen maximizing, volume mute, and activating a link.

10. The method of claim 7, further comprising: receiving a nose factor (NF) for each candidate video advertisement based on noisiness of the candidate video advertisement; and computing RANK=(NF+LF)×IF×bid.

11. The method of claim 7, wherein selecting, by the processor, an initial set of candidate video advertisements based on content information derived from the Web page comprises matching topical keywords associated with content of the Web page to topical keywords derived from each of the video advertisements.

12. The method of claim 11, wherein the content of the Web page comprises content of a video program provided on the Web page.

13. A system for maximizing revenue from video advertisements served at an Internet Web site, comprising:
   a processor; and
   a non-transitory computer-readable storage medium comprising a program of instructions for selecting and serving the video advertisements, wherein the processor executes the program of instructions to:
   receive a request for a video advertisement to serve at a Web page, the video advertisement having playback features;
   select an initial set of candidate video advertisements responsive to the request based on content information derived from the Web page;

rank each candidate video advertisement in the initial set of candidate video advertisements, comprising:
- receive a length factor (LF) for each candidate video advertisement, a higher length factor (LF) corresponding to a shorter duration
- receive an interestingness factor(IF) for each candidate video advertisement, the interestingness factor (IF) representing the probability of the candidate video content segment being played and computed based on a number of video plays and one or more of a number of video replays, a number of video maximizes, and a number of link activations,
- receive a bid for one or more of the candidate video advertisements, and
- compute RANK=LF×IF×bid for each of the one or more candidate video advertisements for which a bid was received;

and select one or more of the ranked candidate video advertisements to serve on the Web page.

14. The system of claim 13, wherein to receive the interestingness factor (IF), the processor:
- receives on or more metrics values based on data recorded from user interactions while watching a video advertisement;
- combines the metrics values to produce a normalized value of the interestingness factor (IF).

15. The system of claim 14, wherein the processor receives the metrics values from a browser displaying the video advertisement, and wherein the metrics values relate to one or more of pauses/stops, played length, replays, viewing screen maximizing, volume mute, and activating a link.

16. The system of claim 13, wherein the processor:
- receives a noise factor (NF) for each candidate video advertisement based on noisiness of the candidate video advertisement; and
- computing RANK as a combination of NF, LF, IF, and bid.

17. The system of claim 13, wherein the processor selects the set of candidate video advertisements based on content information derived from the Web page matching content information derived from each of the video advertisements.

18. The system of claim 17, wherein the content of the Web page comprises content of a video program provided on the Web page.

* * * * *